US012375806B2

(12) United States Patent
Tsairi et al.

(10) Patent No.: US 12,375,806 B2
(45) Date of Patent: Jul. 29, 2025

(54) DYNAMIC IMAGE CAPTURE DEVICE CONFIGURATION FOR IMPROVED IMAGE STABILIZATION

(71) Applicant: QUALCOMM Incorporated, San Diego, CA (US)

(72) Inventors: Eliad Tsairi, Hof HaCarmel (IL); Ron Gaizman, Hof HaCarmel (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/051,727

(22) Filed: Nov. 1, 2022

(65) Prior Publication Data

US 2023/0412922 A1 Dec. 21, 2023

Related U.S. Application Data

(60) Provisional application No. 63/366,750, filed on Jun. 21, 2022.

(51) Int. Cl.
*H04N 23/68* (2023.01)
*H04N 23/63* (2023.01)

(52) U.S. Cl.
CPC ....... *H04N 23/6812* (2023.01); *H04N 23/632* (2023.01); *H04N 23/684* (2023.01)

(58) Field of Classification Search
None
See application file for complete search history.

(56) References Cited

U.S. PATENT DOCUMENTS

| 11,006,044 | B1 | 5/2021 | Jayakumar et al. |
| 11,190,689 | B1* | 11/2021 | Wang ............... H04N 23/90 |
| 2009/0278921 | A1* | 11/2009 | Wilson ............... A61B 1/045 |
| | | | 348/208.4 |
| 2017/0041545 | A1* | 2/2017 | Murgia ............. H04N 23/6812 |
| 2019/0058821 | A1* | 2/2019 | Lee ................. H04N 23/671 |
| 2020/0267320 | A1 | 8/2020 | Song et al. |
| 2020/0366824 | A1* | 11/2020 | Hofer ................ H04N 23/689 |
| 2021/0337123 | A1 | 10/2021 | Nyström et al. |

FOREIGN PATENT DOCUMENTS

WO WO-2022026126 A1 * 2/2022 ......... H04N 5/23254

OTHER PUBLICATIONS

International Search Report and Written Opinion—PCT/US2023/068351—ISA/EPO—Sep. 29, 2023.

* cited by examiner

*Primary Examiner* — James M Hannett
(74) *Attorney, Agent, or Firm* — QUALCOMM Incorporated

(57) ABSTRACT

This disclosure provides systems, methods, and devices for image processing that support improved image quality from reduced artifacts and wobbles. In a first aspect, a method of image processing includes receiving motion data regarding movement of a mobile device; determining a first image sensor configuration based on the motion data; and configuring an image sensor with the first image sensor configuration. Other aspects and features are also claimed and described.

29 Claims, 7 Drawing Sheets

| Activity Class | | Configuration |
|---|---|---|
| Hiking | EXP1-EXP2 | Image Sensor Configuration 1 |
| Cycling | EXP2-EXP3 | Image Sensor Configuration 2 |
| Activity N | EXP(N-1)-EXP(N) | Image Sensor Configuration N |

FIG. 6B

| Activity Class | Configuration |
|---|---|
| Hiking | Readout Duration 1, Aspect Ratio 1 |
| Cycling | Readout Duration 2, Aspect Ratio 1 |
| Activity N | Readout Duration N, Aspect Ratio N |

FIG. 7

DYNAMIC IMAGE CAPTURE DEVICE CONFIGURATION FOR IMPROVED IMAGE STABILIZATION

CROSS-REFERENCE TO RELATED PATENT APPLICATION

This patent application claims the benefit of priority of U.S. Provisional Patent Application No. 63/366,750 filed on Jun. 21, 2022 and entitled "Dynamic Image Sensor Configuration for Improved Image Stabilization in an Image Capture Device," which is incorporated by reference herein.

TECHNICAL FIELD

Aspects of the present disclosure relate generally to image processing, and more particularly, to improving image stabilization to reduce undesired motion artifacts. Some features may enable and provide improved image processing, including improved appearance of photographs of subjects and objects in a scene while the camera is in motion.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Blurring of objects in a scene captured by the image capture device may reduce the image quality of photos or videos. Other issues that may result from movement during recording are geometric distortions of the objects, distortions such as rolling shutter distortion, lens distortion, and z-lens positions FOV effects.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, an activity performed by a user while recording photographs and/or videos may be determined and image processing adapted based on the user activity. Example classification of activities include whether activities are indoor or outdoor, stationary or moving, or walking or running. In some embodiments, the configuration of the image sensor for capturing image data may be adapted based on the motion data and/or classification of the user activity, which may be determined from motion sensors such as a gyroscope, accelerometer, and/or magnetometer. Example image sensor configuration parameters for adjusting based on user activity include a readout duration, aspect ratio, and/or other attribute of the image sensor configuration based on the user activity. Configuration of the image sensor changes the image data received from the sensor and the representation of the scene recorded in the image data.

In one aspect of the disclosure, a method for image processing includes receiving motion data regarding movement of a mobile device; determining a first image sensor configuration based on the motion data; and configuring an image sensor with the first image sensor configuration. Image data may be collected by the image sensor in the image sensor configuration. That image data may be further processed to determine an output image frame, which may be a photograph or part of a video. The resulting photograph or video may have reduced blurring or other distortion because the image sensor configuration was determined based on motion data. In some embodiments, the image sensor configuration is based on an activity class for the user determined from the motion data.

Adaptive control of the image sensor configuration based on motion may reduce the appearance of certain artefacts in images captured by an image sensor with the image sensor configuration. For example, the image sensor configuration may be used for distortion correction due to physical design resulting in, for example, rolling shutter (RSC). As another example, the image sensor configuration may be used for global motion correction caused by the user including high-frequency motion (due to undesired hand shaking) and/or low-frequency motion (due to panning or walking motions).

In an additional aspect of the disclosure, an apparatus includes at least one processor and a memory coupled to the at least one processor. The at least one processor is configured to perform operations including receiving motion data regarding movement of a mobile device; determining a first image sensor configuration based on the motion data; and configuring an image sensor with the first image sensor configuration.

In an additional aspect of the disclosure, an apparatus includes means for receiving motion data regarding movement of a mobile device; means for determining a first image sensor configuration based on the motion data; and means for configuring an image sensor with the first image sensor configuration.

In an additional aspect of the disclosure, a non-transitory computer-readable medium stores instructions that, when executed by a processor, cause the processor to perform operations. The operations include receiving motion data regarding movement of a mobile device; determining a first image sensor configuration based on the motion data; and configuring an image sensor with the first image sensor configuration.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6B is a table illustrating a mapping of movement activity classes to image sensor configurations according to some embodiments of the disclosure.

FIG. 7 is a table illustrating a mapping of movement activity classes to image sensor configurations according to some embodiments of the disclosure.

Like reference numbers and designations in the various drawings indicate like elements.

DETAILED DESCRIPTION

Figure 1:
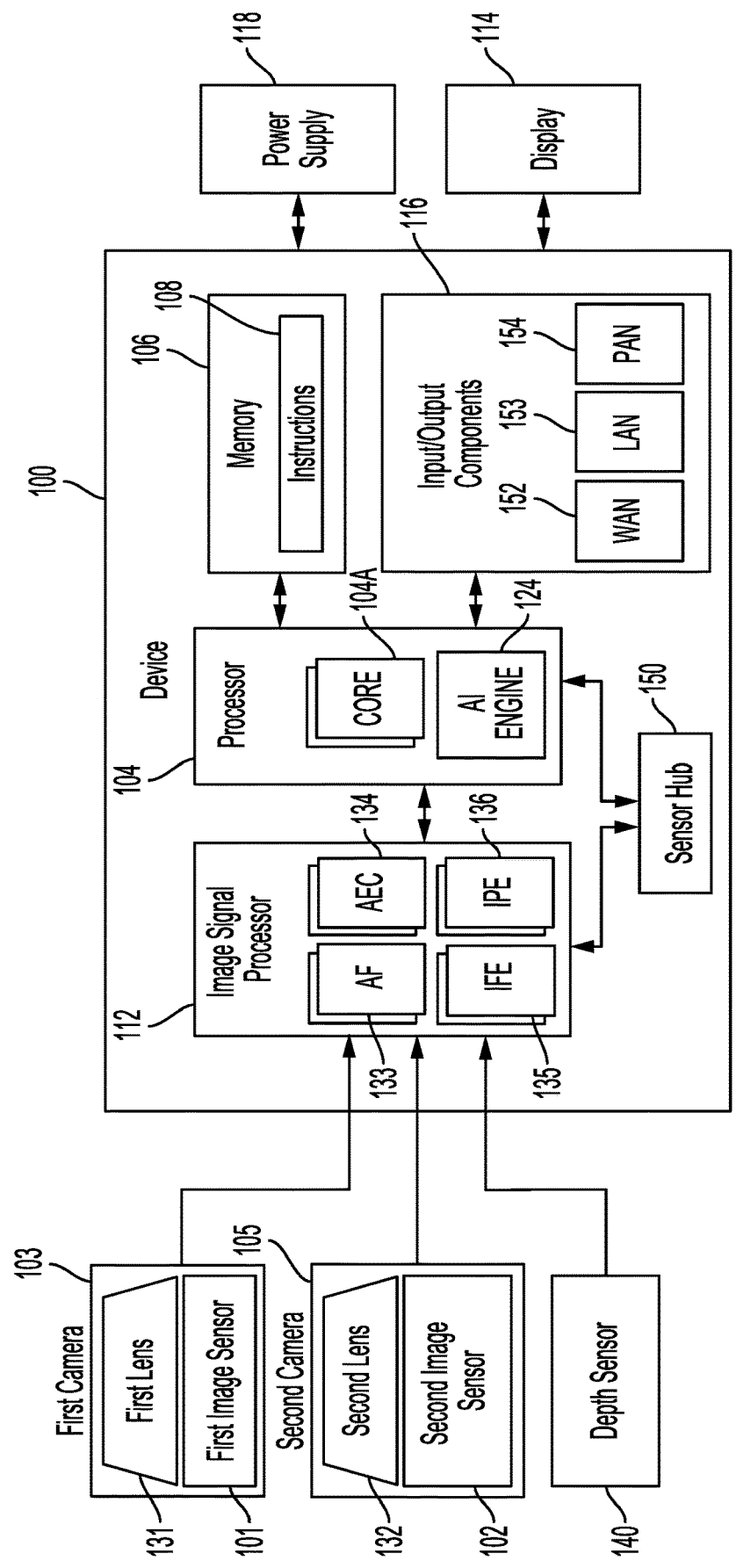
FIG. 1 shows a block diagram of an example device for performing image capture from one or more image sensors according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved image processing for receiving motion data regarding movement of the image capture device from the motion sensor; determining a first image sensor configuration based on the motion data; configuring the first image sensor with the first image sensor configuration; receiving image data from the first image sensor while the first image sensor is configured with the first image sensor configuration; applying image stabilization to the image data to determine output image frames; and displaying a preview image on the display based on the output image frames Particular implementations of the subject matter described in this disclosure may be implemented to realize one or more of the following potential advantages or benefits. In some aspects, the present disclosure provides techniques for improving image appearance by reducing artifacts or wobble caused by high frequency shaking during periods of high motion causing movement of the image capture device. The reduced artifacts or wobble may be a result of an image sensor configuration with a shorter readout duration to reduce rolling shutter effect in the captured image data and/or may be a result of an image sensor configuration with increased margins improving operation of image stabilization operations. Further, power consumption may be reduced while maintaining scene stabilization quality when motion is low.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands.

The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. A further example non-camera sensor is a magnetometer, a device for measuring magnetic fields similar to a compass, which may be used to determine direction of movement and/or orientation of the device. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140 and/or CPU 104.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and/or one or more auto exposure compensation (AEC) 134 engines. The AF 133, AEC 134, IFE 135, IPE 136 may each include application-specific circuitry, be embodied as software code executed by the ISP 112, and/or a combination of hardware within and software code executing on the ISP 112. The ISP 112 may additionally execute an automatic white balancing (AWB) engine for performing white balancing operations. The AWB engine may execute in, for example, the image front ends (IFEs) 135 or other dedicated or general processing circuitry within the ISP 112 or the image capture device 100, such as on a digital signal processor (DSP).

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with, the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components shown as the device 100.

Figure 2:
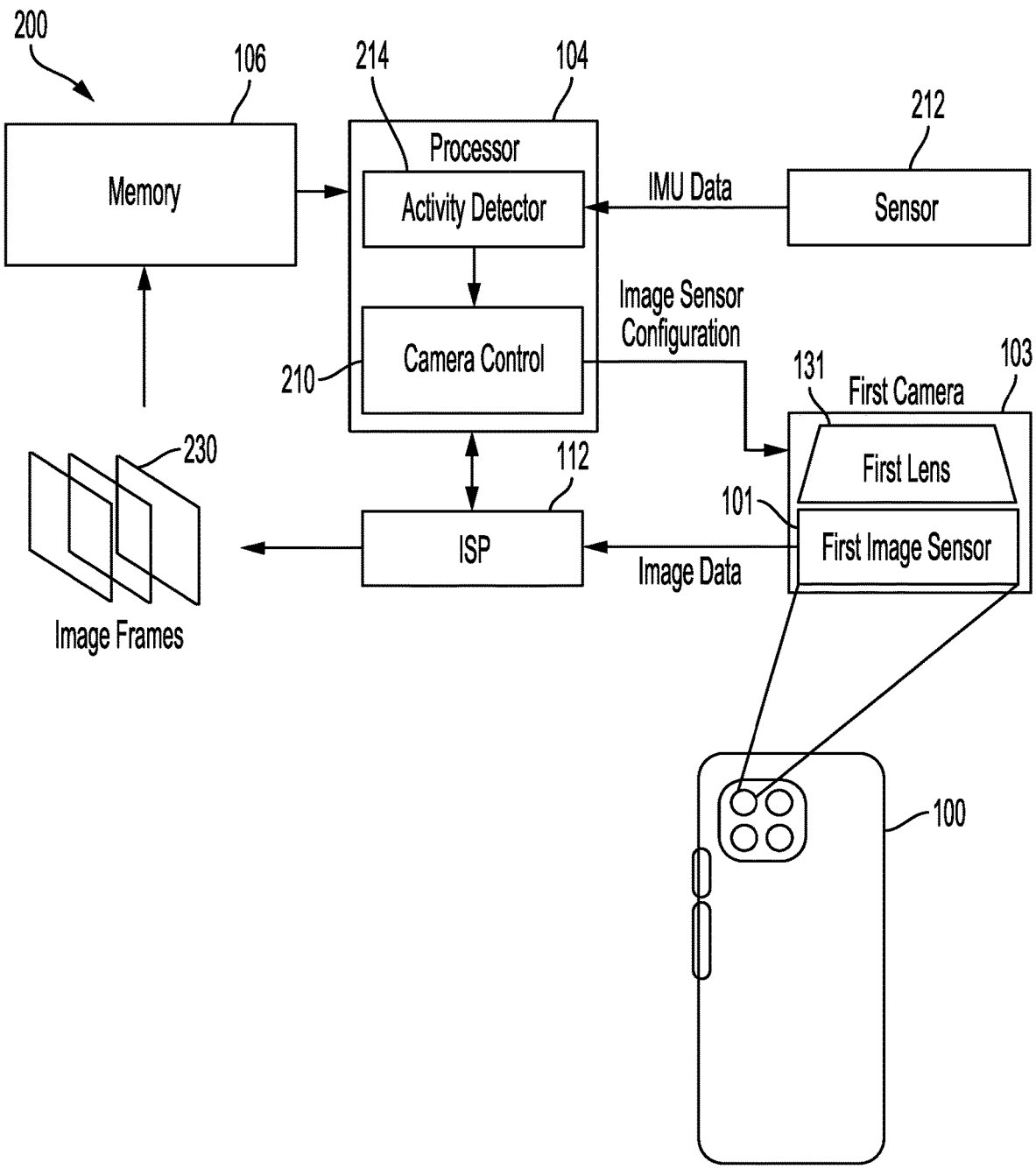
FIG. 2 shows a block diagram of an example processing configuration for configuring an image capture device for improving image stabilization according to one or more aspects of the disclosure.

FIG. 2 shows a block diagram of an example processing configuration for configuring an image capture device for improving image stabilization according to one or more aspects of the disclosure. A processor 104 of system 200 may communicate with image signal processor (ISP) 112 through a bi-directional bus and/or separate control and data lines. The processor 104 may control camera 103 through camera control 210, such as for configuring the camera 103 through a driver executing on the processor 104. The configuration may include an image sensor configuration that specifies, for example, a frame rate, an image resolution, a readout duration, an exposure level, and/or an aspect ratio. The camera 103 may obtain image data based on the image sensor configuration. For example, the processor 104 may execute a camera application to instruct camera 103 to set a first image sensor configuration for the camera 103, to obtain first image data from the camera 103 operating based on the first image sensor configuration, to instruct camera 103 to set to a second image sensor configuration for the camera 103, and to obtain second image data based on the camera 103 operating based on the second image sensor configuration.

The image data received from camera 103 may be processed in one or more blocks of the ISP 112 to determine image frames 230 that are stored in memory 106 and/or provided to the processor 104. The processor 104 may further process the image data to apply effects to image frames 230. Effects may include Bokeh, lighting, color casting, electronic image stabilization (EIS), and/or high dynamic range (HDR) merge. In some embodiments, functionality may be embedded in a different component, such as the ISP 112, a DSP, an ASIC, or other custom logic circuit for performing the additional image processing.

Figure 3:
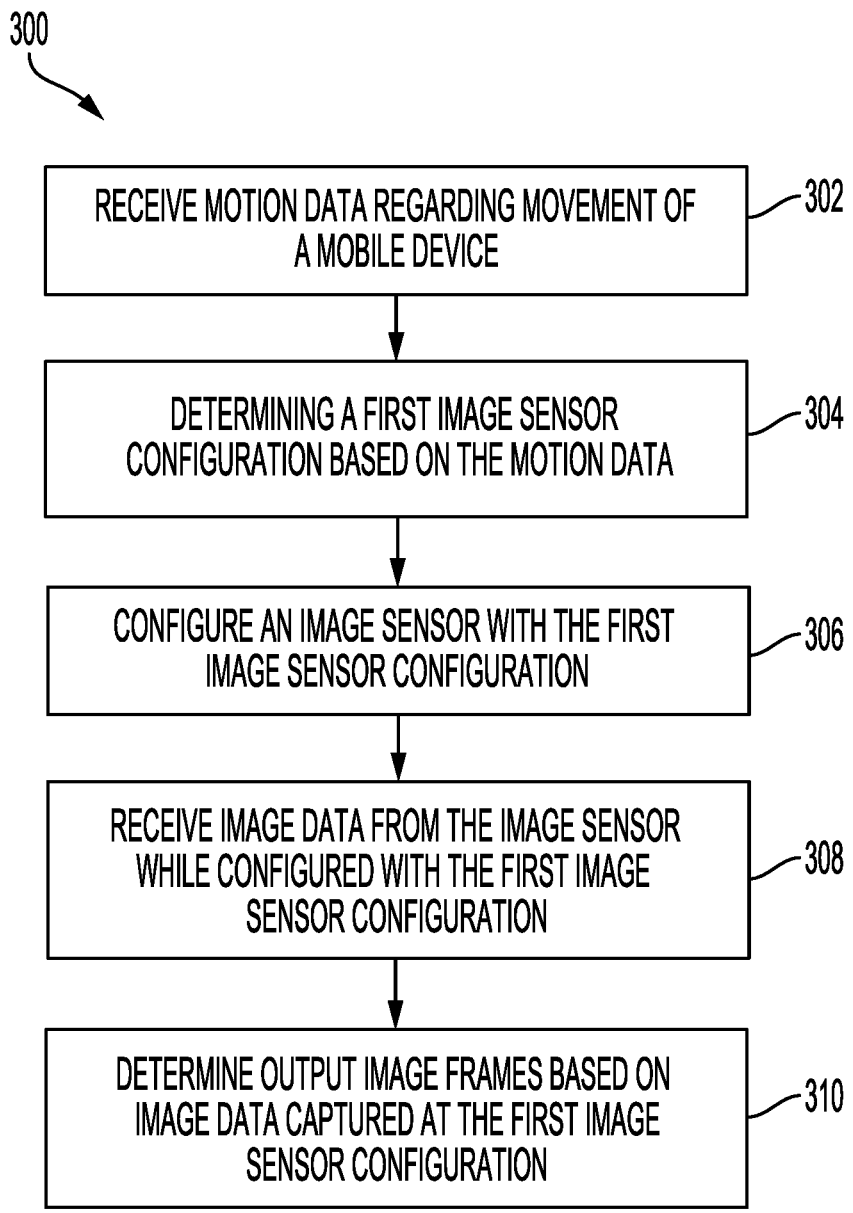
FIG. 3 shows a flow chart of an example method for capturing image data at two or more image sensor configurations based on device motion according to some embodiments of the disclosure.

The system 200 of FIG. 2 may be configured to perform the operations described with reference to FIG. 3 to determine output image frames 230. FIG. 3 shows a flow chart of an example method for capturing image data at two or more image sensor configurations based on device motion according to some embodiments of the disclosure. The capturing operation shown in FIG. 3 may obtain an improved digital representation of a scene, which results in a photograph or video with higher image quality (IQ) or reduce power while maintaining the same quality.

At block 302, motion data regarding movement of a mobile device is received. The motion data may include IMU data from a sensor 212 coupled to the processor 104 through the sensor hub 150 corresponding to image data captured by the camera 103 and/or motion vectors determined from image data. The motion data may include movement measured by a magnetometer, gyroscope, accelerometer, compass, or other device. Additional data may be used as input to the method 300, including being used to determine the motion data, such as focus, exposure time, frames per second, motion vectors, and/or sensor physical design. The motion data may be used to determine a motion value reflecting an amount, magnitude, or variation of movement of the mobile device. The motion data may also or alternatively be used to determine a class of activity for the movement of the mobile device. For example, the movement may be classified as a walking, running, cycling, skiing, or others.

At block 304, a first image sensor configuration is determined based on the motion data. For example, one or more of a frame rate, an image resolution, a readout duration, an exposure level, an aspect ratio may be determined based on the motion data. In some embodiments, part of the image sensor configuration may be determined based on an amount of movement of the device exceeding or not exceeding a threshold value. In some embodiments, part of the image sensor configuration may be determined based on the class of activity for the movement of the mobile device. The class of activity may be determined, for example, from the motion data by correlating the motion data to an activity profile for the kind of motion data. For example, accelerometer data may match a profile corresponding to walking or running. The class of activity may also be determined based on other inputs including non-motion data such as time of day, day of week, and/or location, such as by determining that a user often performs a certain activity at a certain time of day and the image data is captured at approximately that certain time of day. The image sensor configuration may be based on a look-up table specifying one or more attributes of the image sensor configuration based on the motion data. Also, the configuration may be based on the image itself. For example, the user may be determined to not be swimming if no body of water is detected in the image data.

At block 306, an image sensor is configured with the first image sensor configuration. The determined image sensor configuration of block 304 may be applied to the image sensor 101 of the camera 103 by sending a command to the camera 103 and/or writing configuration registers of the camera 103. For example, camera control 210 may be a camera driver executing on the processor 104 and may cause the transmission of a command and/or transfer of register values corresponding to the first image sensor configuration through a bus coupling the processor 104 with the camera 103. The camera control 210 may be activated by a camera application running in an operating system environment executing on the processor 104. The activity detector 214 may likewise be running in the operating system environment executing on the processor 104, such as in a background process or service. The camera control 210 may use an application programming interface (API) to receive information from the activity detector 214 such as the motion data received from the sensor 212, an indication of the motion data received from the sensor 212, and/or an indication of a class of activity determined by activity detector based on the motion data received from sensor 212. In each of these examples the first image sensor configuration determined by camera control 210 and applied to the camera 103 is based on motion data regarding the movement of the device 100.

At block 308, image data is received from the image sensor, in which the image data was captured while the image sensor is configured with the first image sensor configuration. The receipt of the image data may be triggered by the camera application executing on the processor 104 causing camera control 210 to activate capture of image data by the camera 103. The image data is then provided to a processor, such as processor 104 or ISP 112. This image data is captured based on the first image sensor configuration because the command issued at block 306 has taken effect and/or the configuration registers written at block 306 have taken effect.

At block 310, output image frames are determined based on the image data captured at the first image sensor configuration. Image frames 230 may be determined by the processor 104 or ISP 112 and stored in memory 106. The stored image frames may be read by the processor 104 and used to generate an image preview on a display of the device 100 and/or processed to generate a photograph or video for storage in memory 106 and/or transmission to another device.

Movement of the device during image capture may create distortion artifacts and/or wobbles. For example, when a rolling shutter (RS) is used on the image sensor, each row or column of the image sensor is read out at a different time. Movement of the device during readout of the image sensor may cause ghosting, in which an object appears in multiple places in the readout data. Adaptive control of operation of the image sensor may reduce distortion artifacts and/or wobbles by adjusting attributes of the image sensor configuration based on motion data describing a movement of the device. For example, reconfiguring the image sensor to a shorter readout duration may reduce distortion artifacts and/or wobbles when certain motion is detected, such as fast movement in a car, bike, scooter, or drone with a high frequency shake. As one specific example, an image capture device may detect a fast walking activity while a front-facing camera is active for a selfie and, based on detecting those conditions, shorten the readout duration to reduce distortion artifacts and/or wobbles. In another example, detecting a high frequency shake in the movement of the device may cause the processor to set a first image sensor configuration with a short readout duration to improve image quality, or set a first image sensor configuration with a normal readout duration to reduce power consumption if no high frequency shake is detected. A readout duration may be set, for example, by adjusting a frame rate value attribute in the image sensor configuration, in which a higher frame rate corresponds to a shorter readout duration. An increase in the pixel read frequency from the image sensor corresponding to the shorter readout time may consume additional power. The dynamic control of the image sensor configuration may allow the device to obtain the improved image quality through shorter readout and also the reduced power consumption of a longer readout duration when the shorter readout duration is not beneficial.

Figure 4:
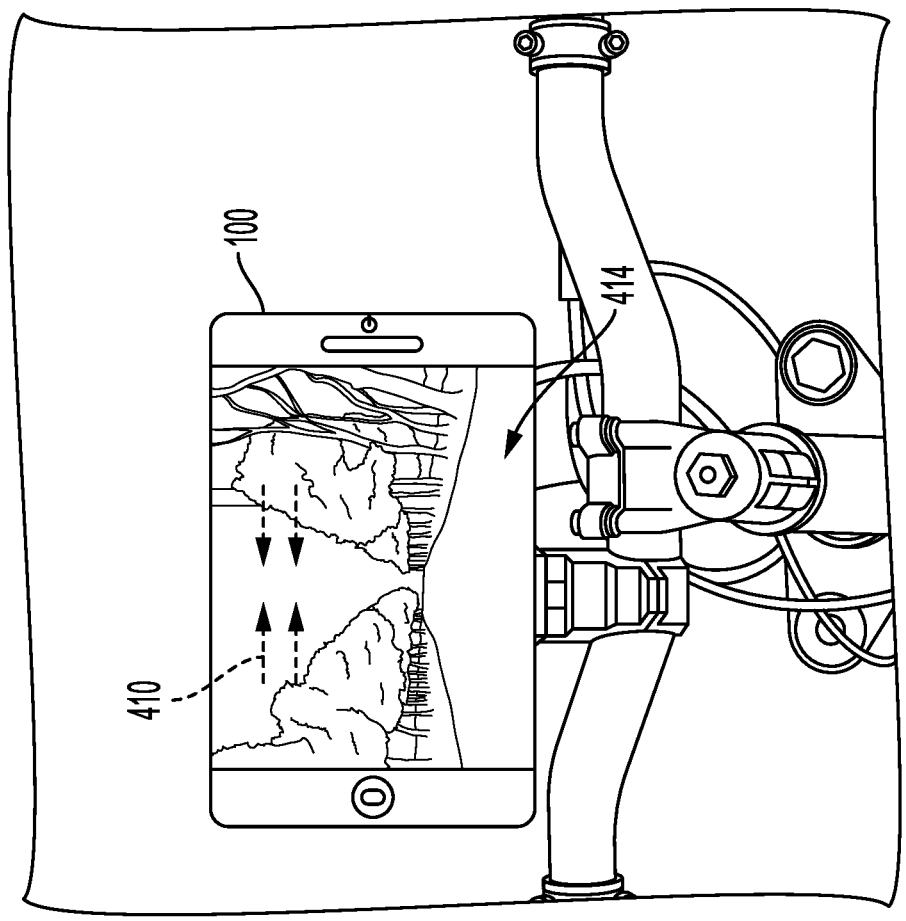
FIG. 4 is an illustration of movement of a mobile device according to some embodiments of the disclosure.

FIG. 4 is an illustration of movement of a mobile device according to some embodiments of the disclosure. The device 100 may be attached to a bicycle during a cycling activity with a camera application executing during the cycling activity. The device 100 may determine motion data measured by the device 100 contains high frequency shake (or identify other criteria indicating a condition likely to result in distortion artifacts and wobbles 410 in captured images). Based on this determination, the device 100 may determine a first image sensor configuration and activate the configuration for image capture at a shorter readout duration. In some embodiments, the motion data may include information from an electronic image stabilization (EIS) algorithm. The EIS algorithm may determine that a distortion correction model is not or will not produce desired image quality and trigger the setting of an appropriate image sensor configuration.

Figures 5, 6A:
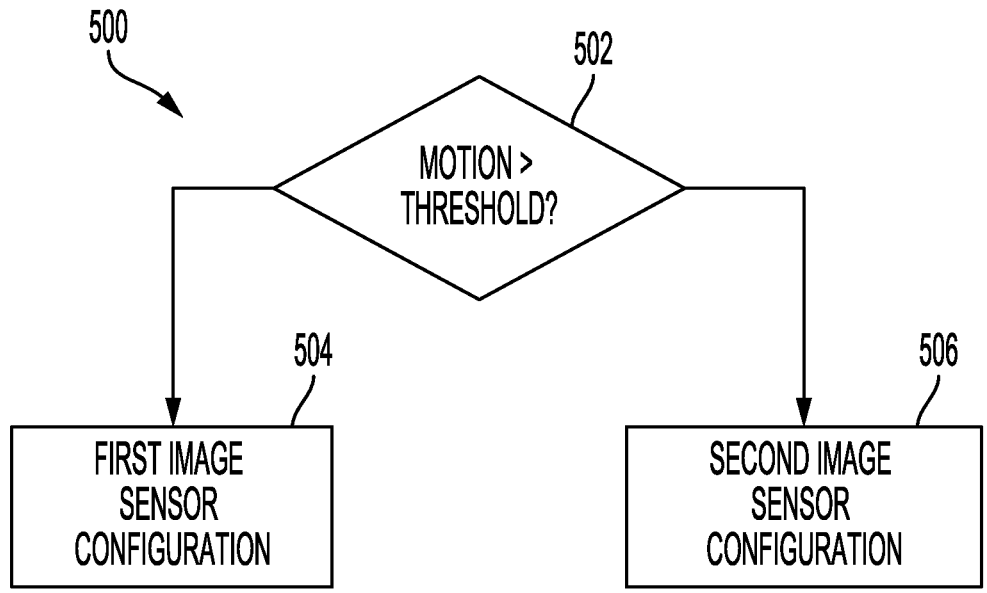
FIG. 5 is a flow chart illustrating an example determination for an image sensor configuration according to some embodiments of the disclosure.
FIG. 6A is a table illustrating a mapping of movement activity classes to image sensor configurations according to some embodiments of the disclosure.

An image sensor configuration may be determined based on one or more criteria. For example, a threshold may be applied to a value describing the movement of the mobile device. The value may be an amplitude value received from an accelerometer or gyroscope. The value may alternatively be a value describing a magnitude of high frequency shake. The criteria may include applying a threshold to either value. FIG. 5 is a flow chart illustrating an example determination for an image sensor configuration according to some embodiments of the disclosure. A method 500 includes comparing a motion value to a threshold at block 502. If the motion value meets the criteria by, for example, exceeding the threshold value then the first image sensor configuration may be selected by the image capture device at block 504. The first image sensor configuration at block 504 may have a larger margin remaining after a crop is applied to image data received at the image sensor to provide more data for image stabilization (IS) to be applied when forming output image frames. If the motion value does not meet the criteria at block 502 then the second image sensor configuration may be selected by the image capture device at block 506. In some embodiments, multiple criteria may be applied at block 502 to select one of two or more image sensor configurations at block 504, 506, or others not shown.

In some embodiments, the image sensor configuration may include setting a margin as described with reference to FIG. 5. In some embodiments, the image sensor configuration may alternatively or additional include selecting an image sensor from a plurality of available image sensors. For example, the image sensor configuration determination may include adaptive camera selection to select between an image sensor with a wide field of view and an image sensor with an ultrawide field of view. In one such embodiment, the first image sensor configuration at block 504 may include a configuration specifying use of the ultrawide field of view to provide additional margin pixels for a portion of interest at a center of the ultrawide field of view when high motion is detected. Likewise, the second image sensor configuration at block 506 may include a configuration specifying use of the wide field of view to reduce margin pixels when low motion is detected. In some embodiments, the sensor ratio may be determined based on the active image sensor field of view. For example, a 16:9 sensor ratio may be determined for an image sensor configuration when a light shake of the image capture device is determined when the ultrawide field of view is active but the same light shake may result in determining an image sensor configuration with a 4:3 sensor ratio when the wide field of view is active.

The motion determination for selecting the wide or ultrawide fields of view may be based on image data from one or more of the available image sensors. For example, motion vectors determined from the wide field of view may be used to determine a high motion condition that results in determination of the image sensor configuration specifying the ultrawide field of view. The adaptive selection, based on motion, of an available field of view may be combined with adaptive selection of a margin and/or a readout duration.

In some embodiments, an activity class describing the movement of the mobile device may be used to determine an image sensor configuration. FIG. 6A is a table illustrating a mapping of movement activity classes to image sensor configurations according to some embodiments of the disclosure. The table includes a column 602 listing possible values for activity classes. The table may function as a look-up table correlating an image sensor configuration shown in column 604 with each of the activity classes in column 602. A hiking activity may be associated with a first image sensor configuration; a cycling activity may be associated with a second image sensor configuration; and further activities may be associated with further image sensor configurations. In some embodiments, an image sensor configuration may be associated with multiple activity classes. In some embodiments, the activity class may be determined based on current image data. In some embodiments, the activity class may be a predicted future activity class corresponding to the next image frame to be captured by the image sensor, with the future activity class determined based on past motion data.

The sensor mode may be determined based on other criteria than the criteria shown in FIG. 6A. For example, exposure time may be used to control the image sensor configuration based on the table of FIG. 6B. FIG. 6B is a table illustrating a mapping of movement activity classes to image sensor configurations according to some embodiments of the disclosure. In some embodiments, exposure may be determined by the automatic exposure correction (AEC) engine and the image sensor configuration selected by the image capture device based on the exposure level. For example, when a hiking activity class is detected with a first exposure level then a first image sensor configuration may be selected and when a hiking activity class is detected with a second exposure level then a second image sensor configuration may be selected. In some embodiments, exposure may be determined based on the activity class. For example, when a hiking activity class is detected then the exposure may be set to an exposure corresponding to the hiking activity class (or the exposure may be limited by an exposure range corresponding to the hiking activity class).

The image sensor configuration may specify an attribute for readout duration and/or aspect ratio of an image sensor for image capture. FIG. 7 is a table illustrating a mapping of movement activity classes to image sensor configurations according to some embodiments of the disclosure. The table includes a column 702 listing possible values for activity classes. The table may function as a look-up table with an image sensor configuration shown in column 704 associated with each of the activity classes in column 702. A hiking activity may be associated with a first image sensor configuration having a first readout duration and a first aspect ratio; a cycling activity may be associated with a second image sensor configuration having a second readout duration and a second aspect ratio; and further activities may be associated with further combinations of readout duration and aspect ratio. In some embodiments, an image sensor configuration may be associated with multiple activity classes.

Figure 8A:
FIG. 8A is an illustration of image capture at a first image sensor configuration according to some embodiments of the disclosure.

Stabilization algorithms for processing the image data received from the image sensor may operate better with larger margins because more margin allows more correction of high motion activities such as running, fast walking, climbing stairs, and other activities. Margin refers to additional data from pixels captured that are outside the region of the sensor corresponding to an output image frame. An example of image sensor output at a first aspect ratio with first margins is shown in FIG. 8A. FIG. 8A is an illustration of image capture at a first image sensor configuration according to some embodiments of the disclosure. Image data 802 may be captured by active pixels of an image sensor, and cropped, such as by processor 104 or ISP 112, to crop region 804 to form an output image frame. The aspect ratio of image data 802 is shown as a 4:3 ratio, but other aspect ratios such as 1:1 may be used. Image data 802 that is outside the crop region 804 is margin data that may or may not be used in determining an output image frame. The crop region 804 reflects the size and shape of the output image frame, with some pixels from the margin outside the crop region 804 used to correct pixels within the crop region 804.

Figure 8B:
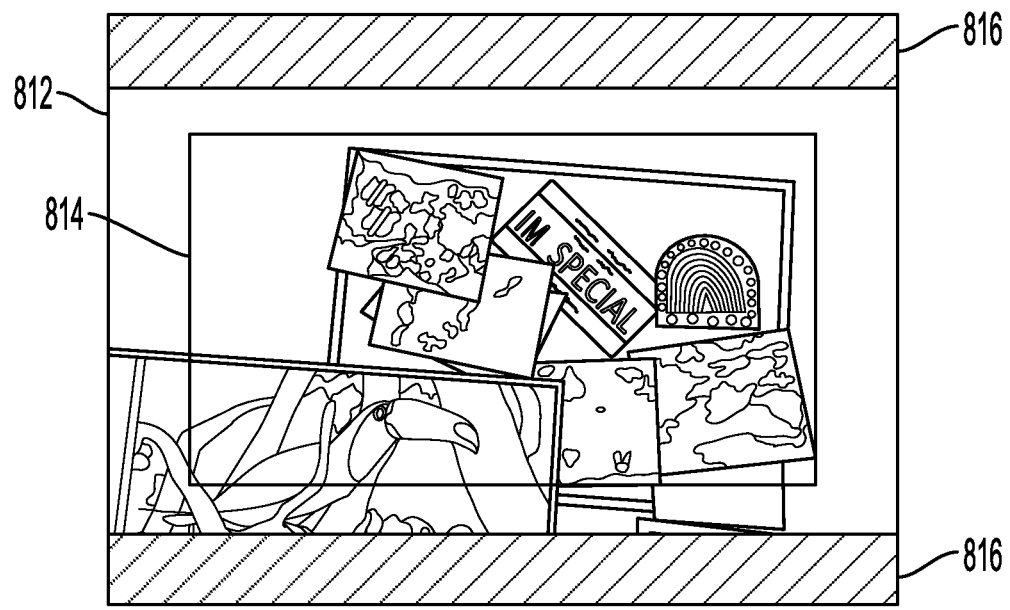
FIG. 8B is an illustration of image capture at a second image sensor configuration according to some embodiments of the disclosure.

A second possible aspect ratio with different margins is shown in FIG. 8B. FIG. 8B is an illustration of image capture at a second image sensor configuration according to some embodiments of the disclosure. Image data 812 may be captured by active pixels of an image sensor, and cropped, such as by processor 104 or ISP 112, to crop portion 814 to form an output image frame. The image sensor capturing image data 812 may have portions 816 that are not active when the image sensor is configured for a certain aspect ratio. For example, the image sensor may have a 4:3 aspect ratio in which some pixels are de-activated when capturing image data at an aspect ratio of 16:9. The margin is the number of pixels between the boundary of crop portion 814 and image data 812. The margin is smaller for the aspect ratio shown in FIG. 8B than for the aspect ratio shown in FIG. 8A.

In certain activities, an aspect ratio, such as 16:9, may have sufficient margins to produce a stable video with reduced or negligible artifacts and/or wobbles. Full sensor margins may be available in the aspect ratio configuration of FIG. 8A when the sensor configuration specifies an aspect ratio that corresponds to an aspect ratio of the physical image sensor. Although the larger margins available at the aspect ratio of FIG. 8A may improve the ability of the ISP or processor for reducing artifacts and/or wobbles, the image sensor configuration consumes more power based on the activation of additional pixels of the image sensor. The smaller margins available at the aspect ratio of FIG. 8B may reduce power consumption. Dynamic configuration between aspect ratios, or other attributes that affect margin, may improve operation of the device. Motion data or user activity class may be used by the image capture device to select an aspect ratio for the image sensor configuration to obtain improved image quality when certain criteria are met. When the criteria are not met, and the additional margin may not be beneficial, the image sensor may be configured for reduced power consumption.

A similar approach of dynamic margins may be applied also at the ISP after extracting image data from the image sensor. Different sizes of margins may be used, for example, a reduced amount of margins may be applied while keeping output size the same resulting in processing less pixels, which may reduce power consumption. In some embodiments, this margin configuration to reduce margins at the ISP may be applied in combination with a margin configuration to reduce margins at the image sensor. For example, reduction of margins at the image sensor may be performed for high motion cases (e.g., motion above a threshold amount) and reduction of margins at the ISP may be performed for low motion cases (e.g., motion above a threshold amount).

In some embodiments, the motion data may be used to improve optical image stabilization (OIS) systems by providing information to improve synchronization of lens movement with capture of the image frame. Such an improved OIS system may be a sync-OIS system. For example, the position of the adjustable lens may be determined to reduce the amount of blur caused by movement of the camera over the course of a frame. More specifically, the lens may be moved to a plurality of positions, relative to the image sensor, over the course of capturing image data corresponding to an image frame, to reduce motion blur in an image due to pitch, yaw, and/or roll motion of the camera assembly during capture of the image data. The plurality of lens positions may be determined based on motion data. Such plurality of lens positions may be determined based on a time-dependent function that takes into account when each row of the image sensor is being exposed over the course of the frame and the motion data describing movement of the image capture device. Further, when the image sensor configuration is adjusted, such as to a shorter or longer readout duration, the determination of the lens positions may be adjusted to accommodate the shorter or longer readout duration. The longer the period between readouts the more time optical image stabilization (OIS) has to move the lens to a determined position.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to perform operations including receiving motion data regarding movement of a mobile device; determining a first image sensor configuration based on the motion data; and configuring an image sensor with the first image sensor configuration. Additionally, the apparatus may perform or operate according to one or more aspects as described below. In some implementations, the apparatus includes a wireless device, such as a UE or BS. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, determining a first image sensor configuration comprises determining a first readout duration based on the motion data when the motion data indicates movement of the mobile device meets a first criteria.

In a third aspect, in combination with one or more of the first aspect or the second aspect, the method further includes determining a second image sensor configuration comprising a second readout duration based on the motion data when the motion data indicates movement of the mobile device meets a second criteria, wherein the second readout duration is longer than the first readout duration and the second criteria indicates mobile device movement of smaller magnitude than the first criteria.

In a fourth aspect, in combination with one or more of the first aspect through the third aspect, receiving motion data comprises receiving at least one of gyroscope data, accelerometer data, OIS data, and wherein the method further comprises determining a motion class for future image data based on the motion data.

In a fifth aspect, in combination with one or more of the first aspect through the fourth aspect, the method further includes determining a first image sensor configuration comprises determining an active portion of pixels based on the motion data for increasing a number of active pixels in the image sensor when the motion data indicates movement of the mobile device meets a first criteria.

In a sixth aspect, in combination with one or more of the first aspect through the fifth aspect, determining an active portion of pixels comprises determining an output aspect ratio for the first image sensor configuration based on the motion data.

In a seventh aspect, in combination with one or more of the first aspect through the sixth aspect, determining an output aspect ratio for the first image sensor configuration comprises determining a 4:3 aspect ratio crop for the image sensor.

In an eighth aspect, in combination with one or more of the first aspect through the seventh aspect, determining a first image sensor configuration comprises determining an increased margin for cropping a scene from image data received from the image sensor to increase margin for image stabilization (IS) of the image data. For example, some aspects may include increasing the margin based on the motion data indicating movement above a threshold and/or decreasing the margin based on the motion data indicating movement below a threshold. As another example, margin may be increased by specifying a first image sensor with a first field of view based on the motion data indicating movement below a threshold and specifying a second image sensor with a larger, second field of view based on the motion data indicating movement above a threshold.

In a ninth aspect, in combination with one or more of the first aspect through the eighth aspect, the method further includes receiving image data from the image sensor, wherein determining a first image sensor configuration is also based on the image data.

In a tenth aspect, in combination with one or more of the first aspect through the ninth aspect, the method further includes receiving image data from the image sensor while configured with the first image sensor configuration; determining a plurality of output image frames based on the image data by applying image stabilization (IS) to the image data by using at least a portion of the margin; and displaying the plurality of output image frames as a preview image of a scene in a field of view of the image sensor.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving motion data regarding movement of a mobile device;
   selecting, as a selected configuration, between a first image sensor configuration and a second image sensor configuration based on whether the motion data indicates that movement of the mobile device satisfies a first criteria; and
   configuring an image sensor arrangement with the selected configuration, wherein the first image sensor configuration and the second image sensor configuration differ from each other with respect to a number of pixels activated in an image sensor of the image sensor arrangement or processed by a processor of the image sensor arrangement to generate an image of a scene, the image being of a predefined size, and wherein the first image sensor configuration and the second image sensor configuration also differ from each other with respect to an aspect ratio of the number of pixels activated in the image sensor.

2. The method of claim 1, wherein:
the duration of the period in which the predetermined number of frames are scanned is longer in the second image sensor configuration than in the first image sensor configuration; and
the first criteria is that a magnitude is greater than a threshold, the selecting (a) being of the first image sensor configuration when the first criteria is satisfied, and (b) being of the second image sensor configuration when the first criteria is not satisfied.

3. The method of claim 1, wherein receiving motion data comprises receiving at least one of gyroscope data, accelerometer data, OIS data, and motion vectors, wherein the method further comprises determining a motion class for future image data based on the motion data, and wherein the selecting is performed based on the motion class determined for the future image data.

4. The method of claim 1, wherein the first image sensor configuration and the second image sensor configuration differ from each other with respect to the number of pixels that are activated in the image sensor to generate the image of the scene, the image being of the predefined size.

5. The method of claim 1, wherein the selecting is performed such that the number of pixels is greater when the motion data indicates movement above a threshold than when the motion data indicates movement that is not above the threshold.

6. The method of claim 1, the first image sensor configuration and the second image sensor configuration differ from each other with respect to which of (a) a first image sensor that has a first field of view and (b) a second image sensor that has a second field of view, which is larger than the first field of view, is used to obtain image data for generating the image, the second image sensor being used based on the motion data indicating movement above a threshold.

7. The method of claim 1, further comprising:
receiving image data from the image sensor while configured with the first image sensor configuration;
determining a plurality of output image frames based on the image data by applying image stabilization (IS) to the image data by using at least a portion of a margin of the image data; and
displaying the plurality of output image frames as a preview image of the scene in a field of view of the image sensor.

8. An apparatus, comprising:
a memory storing processor-readable code; and
at least one processor coupled to the memory, the at least one processor configured to execute the processor-readable code to cause the at least one processor to perform operations including:
receiving motion data regarding movement of a mobile device;
selecting, as a selected configuration, between a first image sensor configuration and a second image sensor configuration based on whether the motion data indicates that movement of the mobile device satisfies a first criteria; and
implementing the selected configuration, wherein the first image sensor configuration and the second image sensor configuration differ from each other with respect to a number of pixels activated in an image sensor or processed by one of the at least one processor to generate an image of a scene, the image being of a predefined size, and wherein the first image sensor configuration and the second image sensor configuration also differ from each other with respect to an aspect ratio of the number of pixels activated in the image sensor.

9. The apparatus of claim 8, wherein:
the duration of the period in which the predetermined number of frames are scanned is longer in the second image sensor configuration than in the first image sensor configuration; and
the first criteria is that a magnitude is greater than a threshold, the selecting (a) being of the first image sensor configuration when the first criteria is satisfied, and (b) being of the second image sensor configuration when the first criteria is not satisfied.

10. The apparatus of claim 8, wherein receiving motion data comprises receiving at least one of gyroscope data, accelerometer data, OIS data, and or motion vectors, wherein the at least one processor is further configured to perform operations including determining a motion class for future image data based on the motion data, and wherein the selecting is performed based on the motion class determined for the future image data.

11. The apparatus of claim 8, wherein the first image sensor configuration and the second image sensor configuration differ from each other with respect to the number of pixels that are activated in the image sensor to generate the image of the scene, the image being of the predefined size.

12. The apparatus of claim 8, wherein the selecting is performed such that the number of pixels is greater when the motion data indicates movement above a threshold than when the motion data indicates movement that is not above the threshold.

13. The apparatus of claim 8, the first image sensor configuration and the second image sensor configuration differ from each other with respect to which of (a) a first image sensor that has a first field of view and (b) a second image sensor that has a second field of view, which is larger than the first field of view, is used to obtain image data for generating the image, the second image sensor being used based on the motion data indicating movement above a threshold.

14. The apparatus of claim 8, wherein the at least one processor is further configured to perform operations including receiving image data from the image sensor, wherein the selecting is performed also based on the image data.

15. The apparatus of claim 8, wherein the at least one processor is further configured to perform operations including:
receiving image data from the image sensor while configured with the first image sensor configuration;
determining a plurality of output image frames based on the image data by applying image stabilization (IS) to the image data by using at least a portion of a margin of the image data, and
displaying the plurality of output image frames as a preview image of the scene in a field of view of the image sensor.

16. A non-transitory computer-readable medium storing instructions that, when executed by at least one processor, cause the at least one processor to perform operations comprising:
receiving motion data regarding movement of a mobile device;
selecting, as a selected configuration, between a first image sensor configuration and a second image sensor configuration based on whether the motion data indicates that movement of the mobile device satisfies a first criteria; and implementing the selected configuration, wherein the first image sensor configuration and the second image sensor configuration differ from each other with respect to a number of pixels activated in an image sensor or processed by one of the at least one processor to generate an image of a scene, the image being of a predefined size, and wherein the first image sensor configuration and the second image sensor configuration also differ from each other with respect to an aspect ratio of the number of pixels activated in the image sensor.

17. The non-transitory computer-readable medium of claim 16, wherein:

the duration of the period in which the predetermined number of frames are scanned is longer in the second image sensor configuration than in the first image sensor configuration; and the first criteria is that a magnitude is greater than a threshold, the selecting (a) being of the first image sensor configuration when the first criteria is satisfied, and (b) being of the second image sensor configuration when the first criteria is not satisfied.

18. The non-transitory computer-readable medium of claim 16, wherein the first image sensor configuration and the second image sensor configuration differ from each other with respect to the number of pixels that are activated in the image sensor to generate the image of the scene, the image being of the predefined size.

19. The non-transitory computer-readable medium of claim 16, wherein the selecting is performed such that the number of pixels is greater when the motion data indicates movement above a threshold than when the motion data indicates movement that is not above the threshold.

20. The non-transitory computer-readable medium of claim 16, the first image sensor configuration and the second image sensor configuration differ from each other with respect to which of (a) a first image sensor that has a first field of view and (b) a second image sensor that has a second field of view, which is larger than the first field of view, is used to obtain image data for generating the image, the second image sensor being used based on the motion data indicating movement above a threshold.

21. The non-transitory computer-readable medium of claim 16, wherein the medium stores instructions that cause the processor to perform further operations comprising:

receiving image data from the image sensor while configured with the first image sensor configuration;

determining a plurality of output image frames based on the image data by applying image stabilization (IS) to the image data by using at least a portion of a margin of the image data; and displaying the plurality of output image frames as a preview image of the scene in a field of view of the image sensor.

22. An image capture device, comprising:
a display;
a motion sensor;
a first camera comprising a first image sensor;
a memory storing processor-readable code; and
at least one processor coupled to the memory, to the motion sensor, to the display, and to the first camera, the at least one processor configured to execute the processor-readable code to cause the at least one processor to perform operations including:

receiving motion data regarding movement of the image capture device from the motion sensor;

selecting, as a selected configuration, between a first image sensor configuration and a second image sensor configuration based on whether the motion data indicates that movement of the image capture device satisfies a first criteria;

implementing the selected configuration;
receiving image data from the first image sensor;
applying image stabilization to the image data to obtain image stabilized image data; and using the image stabilized image data for displaying an image of a scene on the display, wherein the first image sensor configuration and the second image sensor configuration differ from each other with respect to a number of pixels activated in the first image sensor or processed by one of the at least one processor for the generation of the image, the image being of a predefined size, and wherein the first image sensor configuration and the second image sensor configuration also differ from each other with respect to an aspect ratio of the number of pixels activated in the image sensor.

23. The image capture device of claim 22, wherein the duration of the period in which the predetermined number of frames are scanned is longer in the second image sensor configuration than in the first image sensor configuration; and the first criteria is that a magnitude is greater than a threshold, the selecting (a) being of the first image sensor configuration when the first criteria is satisfied, and (b) being of the second image sensor configuration when the first criteria is not satisfied.

24. The image capture device of claim 22, wherein the first image sensor configuration and the second image sensor configuration differ from each other with respect to the number of pixels that are activated in the first image sensor to generate the image of the scene, the image being of the predefined size.

25. The method of claim 1, wherein the first image sensor configuration and the second image sensor configuration differ from each other with respect to the number of pixels processed by the processor of the image sensor arrangement to generate the image of the scene, the image being of the predefined size.

26. The method of claim 1, wherein the first image sensor configuration and the second image sensor configuration differ from each other with respect to the respective rate at which the predetermined number of frames are scanned for generating the image of the scene.

27. The apparatus of claim 8, wherein the first image sensor configuration and the second image sensor configuration differ from each other with respect to the duration of a period in which the predetermined number of frames are scanned for generating the image of the scene.

28. The apparatus of claim 8, wherein the first image sensor configuration and the second image sensor configuration differ from each other with respect to the number of pixels processed by the one of the at least one processor to generate the image of the scene, the image being of the predefined size.

29. The apparatus of claim 8, wherein the first image sensor configuration and the second image sensor configuration also differ from each other with respect to a respective rate at which, or a duration of a period in which, a predetermined number of frames are scanned for generating the image of the scene.

* * * * *